(12) United States Patent
Johanessen et al.

(10) Patent No.: US 7,391,369 B2
(45) Date of Patent: Jun. 24, 2008

(54) METHOD OF AND APPARATUS FOR ELIMINATING QUADRATURE-GENERATED SIGNALS IN MAGNETIC CROSS-LOOP ANTENNAS

(75) Inventors: Paul Johanessen, Lexington, MA (US); Andrie Grebnev, Bedford, MA (US)

(73) Assignee: Megapulse, Inc., Billerica, MA (US)

( * ) Notice: Subject to any disclaimer, the term of this patent is extended or adjusted under 35 U.S.C. 154(b) by 80 days.

(21) Appl. No.: 11/289,741

(22) Filed: Nov. 29, 2005

(65) Prior Publication Data

US 2007/0120739 A1 May 31, 2007

(51) Int. Cl.
*G01S 1/24* (2006.01)
(52) U.S. Cl. .......................................... 342/389; 342/388
(58) Field of Classification Search ................. 342/386, 342/388, 389; 343/741, 744, 748, 866
See application file for complete search history.

(56) References Cited

U.S. PATENT DOCUMENTS

| 4,142,142 | A  | * | 2/1979 | Arce ............................. 324/551 |
| 5,796,366 | A  | * | 8/1998 | Grebnev et al. .............. 342/448 |
| 6,204,821 | B1 | * | 3/2001 | Van Voorhies ............... 343/742 |
| 6,239,760 | B1 | * | 5/2001 | Van Voorhies ............... 343/742 |
| 6,561,022 | B1 | * | 5/2003 | Doyle et al. ................... 73/313 |

* cited by examiner

*Primary Examiner*—Dao L Phan
(74) *Attorney, Agent, or Firm*—Rines and Rines

(57) ABSTRACT

A technique for reducing radio frequency signal navigation errors in systems such as Loran-C and the like, comprising the use of an orthogonally crossed pair of antenna windings on a ferrite cross, tuned to the carrier radio frequency to generate from the received signals both in-phase and quadrature circulating current components, and providing for the eliminating only of the quadrature current components.

16 Claims, 4 Drawing Sheets

Figure 1:
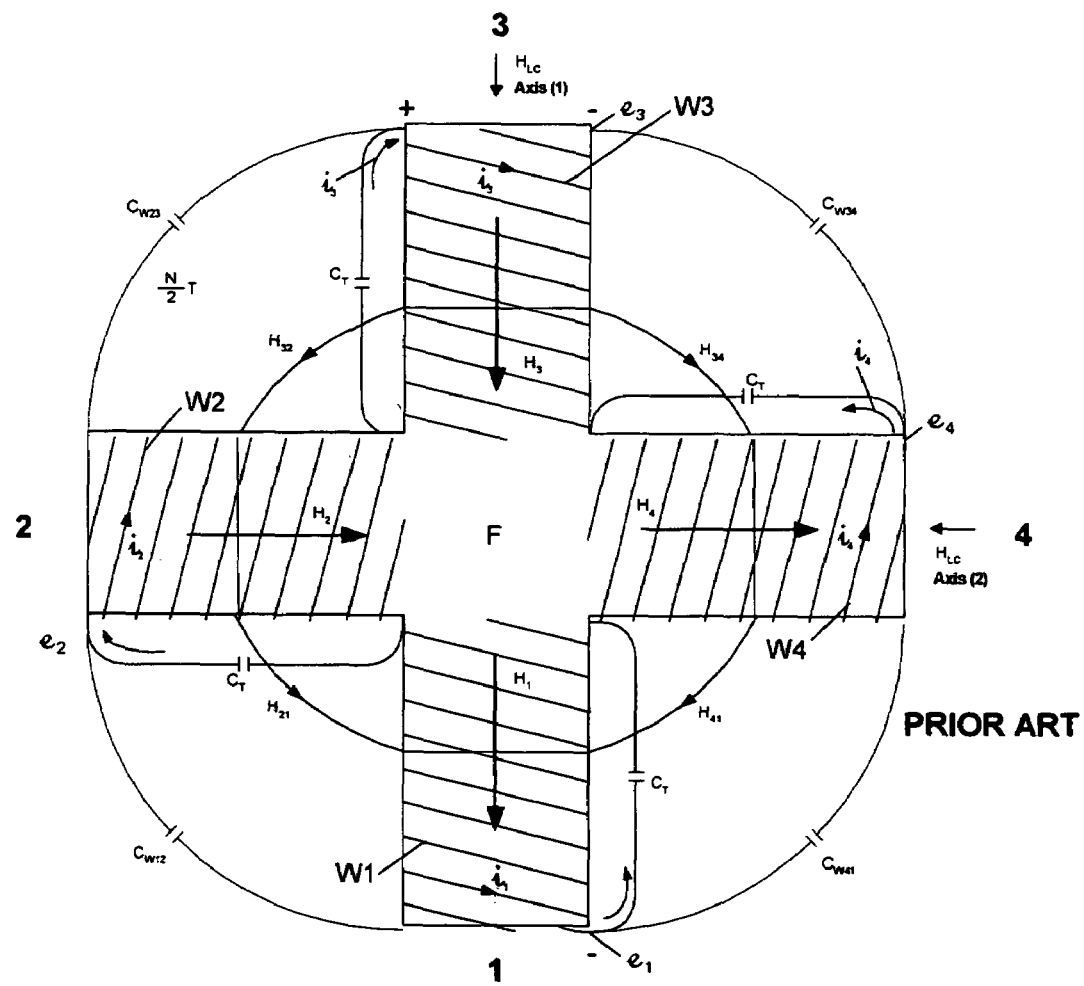

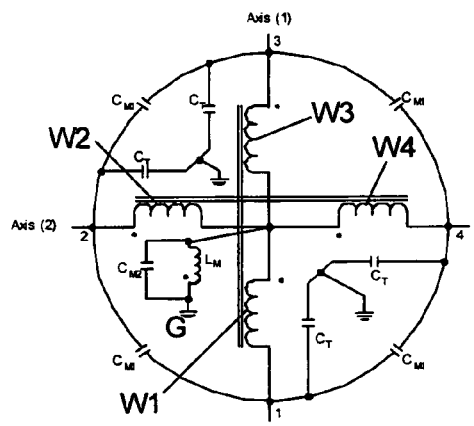
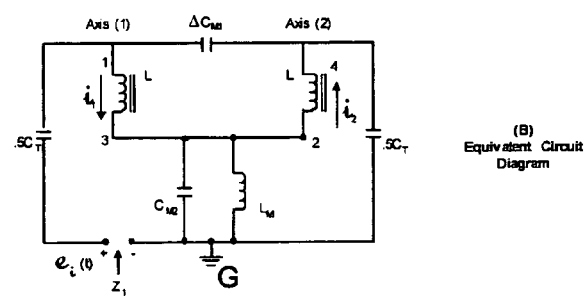
(B)
Equivalent Circuit
Diagram
FIGURE 3 (B)
(A)
Cross-Loop Antenna with
Capacitive and Inductive
Couplings Between the two Axis
FIGURE 3 (A)
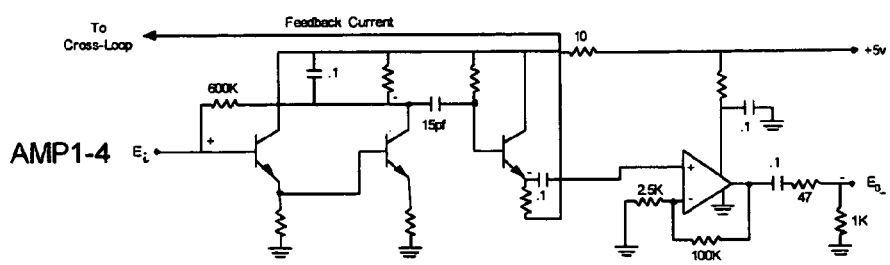
FIGURE 4

METHOD OF AND APPARATUS FOR ELIMINATING QUADRATURE-GENERATED SIGNALS IN MAGNETIC CROSS-LOOP ANTENNAS

FIELD

The present invention relates generally to loop or magnetic H-field antennas and, more specifically, to such antennas particularly adapted for Loran-C navigation signal reception and similar applications as earlier described in U.S. Pat. Nos. 5,580,200 and 6,014,111 of Megapulse, Inc., the common assignee herewith.

BACKGROUND OF INVENTION

While more generically applicable, cross-loop antennas have been finding increased popularity in radio navigation applications, such as Loran-C pulse radio location and tracking systems.

The Loran-C magnetic cross-loop type of antenna consists of four coils wound in two orthogonal pairs on a ferrite cross as described in the above-mentioned patents, and as hereinafter shown in FIG. 1.

Without tuning, the Loran-C H-field generates voltages of the same phase across the four coils and of amplitudes depending upon the angular orientation of the cross-loop antenna with respect to the H-field. These induced voltages do not cause any navigation position errors.

To increase the signal strength, however, these coils are usually tuned to the Loran-C frequency $\omega_c$ by means of capacitors shunting the coils. When the coils are so tuned to the carrier frequency, however, circular currents are generated in the four tuned circuits, and these currents have both in-phase and quadrature components. The quadrature current components, moreover, cause a shift in the antenna current zero crossings and consequently cause deleterious navigation position errors. Such errors must be eliminated in order to make such a loop antenna useful in applications such as in radio signal navigation. The present invention is directed to the effective elimination of such quadrature current components and such errors with simple apparatus.

OBJECTS OF INVENTION

It is accordingly an object of the invention to provide a novel method of and apparatus for effectively eliminating such navigation errors or the like and with simple and inexpensive techniques.

Other and further objects will be later described and more particularly pointed out in the appended claims.

SUMMARY

In summary, however, from one of its viewpoints, the invention embraces in a magnetic cross-loop ferrite antenna system of orthogonally crossed pairs of windings on a ferrite cross for receiving Loran-C navigation radio signals of predetermined carrier frequency and for position-determining therefrom in response to the angular orientation of the cross-loop antenna with respect to the H-field of the signals, wherein the antenna current zero crossings are used as references for the position determination, a method of operating said antenna for receiving said signals, that comprises, tuning the cross pairs of windings to said carrier frequency to generate from the received signals circulating currents having both in-phase and quadrature components; and eliminating only the quadrature current components to prevent their causing a shift in the antenna current zero crossings and resulting position errors caused thereby.

Preferred and best mode designs, configurations and operations are hereinafter described in detail.

DRAWINGS

Figure 2:
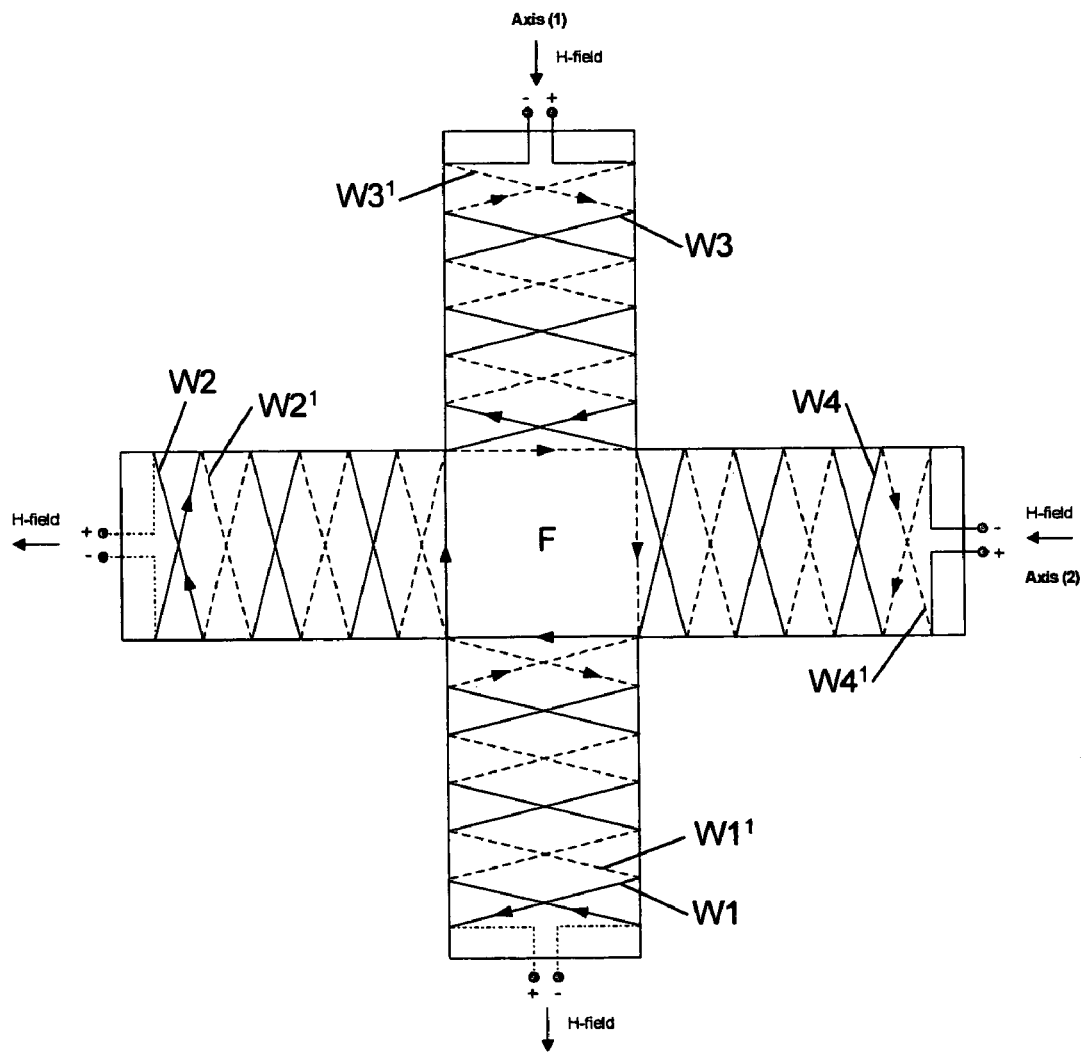
Figure 5:
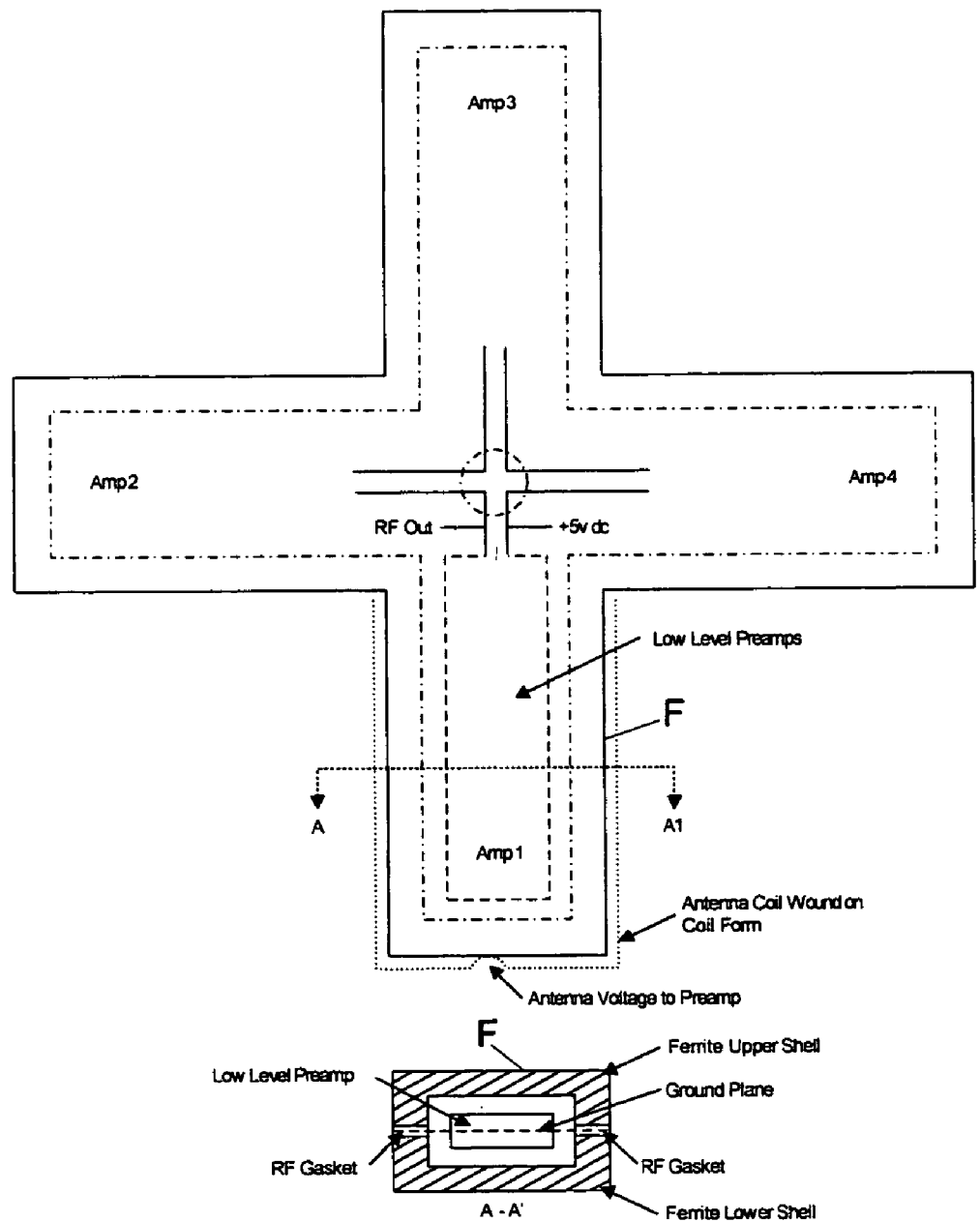

The invention will now be described with reference to the accompanying drawings, FIG. 1 of which is a generalized schematic diagram of a magnetic cross-loop antenna, showing associated current flows;

FIG. 2 is a similar diagram showing a winding configuration designed to eliminate the quadrature currents;

FIGS. 3A and B are schematic diagrams showing the use of introduced capacitive and inductive components for also eliminating such quadrature currents in the antenna of FIG. 3A, an equivalent circuit diagram of which is shown in FIG. 3B;

FIG. 4 is a circuit diagram of a low noise, low level amplifier particularly useful with the antennas of the invention; and FIG. 5 is a preferred ferrite cross-loop structure that can accommodate amplifiers as in FIG. 4.

DESCRIPTION OF PREFERRED EMBODIMENT(S) OF INVENTION

In FIG. 1, a preferred magnetic cross-loop type of antenna suitable, for example, for Loran-C radio navigation signal reception and the like is shown comprising four coils on helical windings W1-W4 upon a ferrite cross structure F, with the coils W1 and W3 wound upon legs 1 and 3, shown vertical along axis (1), and coils W2 and W4 wound along the orthogonal legs 2 and 4 extending along axis (2), responsive to received signal magnetic fields $H_{LC}$ along the respective axes.

As earlier mentioned, to increase the signal strength, these coils are tuned to the carrier frequency $\omega_c$ by means of capacitors $C_T$, shunting the coils; and when the coils are so tuned, circular currents, shown respectively at $i_1$ through $i_4$, are generated in the respective four tuned circuits. As also before explained, these currents have both in-phase and quadrature components, the latter of which cause a shift in the antenna current zero crossings and consequently create navigation signal position errors. The respective developed voltages $e_1$ through $e_4$ producing the corresponding currents $i_1$ through $i_4$, FIG. 1, set up corresponding axial magnetic fields $H_1$ through $H_4$, resulting in cross magnetic fields shown in the loops $H_{21}$, $H_{32}$, $H_{34}$ and $H_{41}$.

The unwanted quadrature current components can, in accordance with the invention, be eliminated in two ways.

A first way is to add second coil windings $W1^1$-$W4^1$ on each of the specific antenna coils W1-W4. This second winding is wound on top of the first winding, as shown in FIG. 2, with the same pitch clockwise, but in the opposite direction. Thus, the magnetic coupling between axis (1) and axis (2) has been eliminated.

Another way of eliminating quadrature current components in accordance with the invention, is to introduce "inductive" or "capacitive" couplings as shown in FIG. 3(A). Inductive coupling is obtained by connecting an inductor Lm, between the center C of the cross and ground G, as shown in FIG. 3(A). Capacitive coupling can be obtained by two methods: method (1) is to connect a capacitor CM2 between the center of the cross C and ground G, as shown also in FIG.

3(A). Method (2) is to connect a capacitor, $\Delta^C{}_{M1}$, between the two axis as shown in FIG. (3B).

To determine the relation between the currents in axis (1) and axis (2), consider that axis (1) is excited by a unit voltage impulse.

For the inductive coupled case ($\Delta C_{M1}=0$, $C_{M2}=0$) the Laplace Transform of the antenna current in Axis (1) is $$I_1(s) = \frac{E_i(s)}{Z_1(s)} = \frac{L+L_M}{(L+2L_M)L} \frac{s(s^2+\alpha^2)}{(s^2+\beta^2)(s^2+\lambda^2)} E_i(S).$$

For $E_i(s) = 1$, (unit impulse), $$i_1(t) = \frac{L+L_m}{(L+2L_m)L} \frac{\alpha^2+\beta^2}{\lambda^2-\beta^2} 2\cos\frac{1}{2}(\beta+\lambda)t\cos\frac{1}{2}(\beta-\lambda)t,$$

where $\alpha^2 = \frac{1}{(L+L_m)\cdot 5C_T}$, $\beta^2 = \frac{1}{(L+2L_m)\cdot 5C_T}$, $\lambda^2 = \frac{1}{L\cdot 5C_T}$ Axis (2) current is (unit impulse response)

$$I_2(s) = \frac{L_m}{(L+2L_M)} \frac{s^2}{(s^2+\beta^2)(s^2+\lambda^2)},$$

$$i_2(t) = \frac{L_M}{L+2L_M} \frac{\beta}{\lambda^2-\beta^2} 2\sin\frac{1}{2}(\beta+\lambda)t\cos\frac{1}{2}(\beta-\lambda)t.$$

The current $i_2(t)$ has a current component 90° out-of-phase with respect to the current, $i_1(t)$, thus generating a quadrature current component.

For method (1) capacitive coupled case, the currents $i_1(t)$ and $i_2(t)$ are $$i_1(t) = \frac{1}{L} \frac{\alpha^2+\beta^2}{\lambda^2-\beta^2} 2\cos\frac{1}{2}(\beta+\lambda)t\cos(\beta-\lambda)t \text{ and}$$

$$i_2(t) = -\frac{1}{L^2C_{M2}} \frac{1}{\lambda^2-\beta^2} 2\sin\frac{1}{2}(\beta+\lambda)t\sin(\beta-\lambda)t,$$

where $\alpha^2 = \frac{C+C_{M2}}{LCC_{M2}}$, $\beta^2 = \frac{1}{LC_T}$, $\lambda^2 = \frac{2C+C_{M2}}{LCC_{M2}}$.

The current $i_2(t)$ has a component −90° out-of-phase with respect to the current $i_1(t)$ Thus, if the magnetic cross-loop antenna has inductive coupling between the two axes, this inductive coupling can be eliminated by introducing "capacitive" coupling.

For method (2) capacitive coupling, the currents $i_1(t)$ and $i_2(t)$ are $$i_1(t) = \frac{1}{L} \frac{\alpha^2+\beta^2}{\lambda^2-\beta^2} 2\cos\frac{1}{2}(\beta+\lambda)t\cos\frac{1}{2}(\beta-\lambda)t \text{ and}$$

$$i_2(t) = \frac{\Delta C_{M1}}{(C_T+\Delta C_{M1})C_T L^2} 2\sin\frac{1}{2}(\beta+\lambda)t\cos(\beta-\lambda)t,$$

where $\alpha^2 = \frac{1}{L(C_T+\Delta C_{M1})}$, $\lambda^2 = \frac{1}{LC_T}$, $\beta^2 = \frac{1}{L(C_T+\Delta C_{M1})}$.

As seen from these equations, the quadrature current generated is of the same phase as for the inductive coupled case.

The magnitude of the signals that are generated by the H-field in the four coils or windings are only a few μvolts. To increase the signal level, low noise, low level identical feedback amplifiers may be used such as Amps1-3 in FIG. 5. A schematic circuit diagram of such a suitable amplifier is shown in FIG. 4.

In order to eliminate magnetic and electric coupling between the two axes of the cross-loop, these amplifiers may be located inside the four spokes as shown in FIG. 5. In before-mentioned U.S. Pat. No. 6,014,111, "Ferrite Crossed-Loop Antenna of Optimal Geometry and Construction and Method of Forming Same," it is shown that a thin-walled ferrite structure is just as effective in a magnetic loop antenna as a solid ferrite structure of the same shape. Thus, the use of hollow spokes in the ferrite loop antenna not only provides a shielded space for the low level amplifier, but also reduces the amount of ferrite material, resulting in a reduced cost and weight of the cross-loop antenna.

The Loran-C E-field is in quadrature with the magnetic field and thus generates quadrature signals in the magnetic cross-loop antenna. To minimize the reception of the E-field, the ferrite cross of FIG. 5 is grounded to the ground planes of the four circuit boards. The circuit board ground plan is extended outside the circuit board and is clamped by the upper and lower ferrite shells, so labeled, together with the RF Gasket. This clamping is provided by the antenna coil form. Thus, the surface of the ferrite cross forms the ground plane for the antenna. In practical constructions, the effective height of this antenna may be less than one millimeter.

Further modifications will occur to those skilled in this art and such are considered to fall within the spirit and scope of the present invention as defined by the appended claims.

What is claimed is:

1. In a magnetic cross-loop ferrite antenna system of orthogonally crossed pairs of windings on a ferrite cross for receiving Loran-C navigation radio signals of predetermined carrier frequency and for position determining therefrom in response to the angular orientation of the cross-loop antenna with respect to the H-field of the signals, wherein the antenna current zero crossings are used as references for the position determination, a method of operating said antenna for receiving said signals, that comprises, tuning the cross pairs of windings to said carrier frequency to receive therein circulating currents having both in-phase and quadrature components; and eliminating only the quadrature current components to prevent their causing a shift in the antenna current zero crossings and resulting position errors caused thereby.

2. The method of claim 1 wherein the quadrature current components elimination is effected by adding second pairs of orthogonal windings wound respectively on top of the first-wound pairs with the same pitch clockwise, but in the opposite direction.

3. The method of claim 1 wherein the quadrature current components elimination is effected by connecting one or both of inductive or capacitive couplings between the center of the cross antenna windings and ground, respectively to counter capacitance or inductive coupling between the axes of the cross-loop.

4. The method of claim 1 wherein the quadrature current components elimination is effected by connecting a capacitor between the windings of the two cross-loop axes.

5. The method of claim 1 wherein magnetic and electric coupling between the two axes of the cross loop antenna is eliminated by locating respective winding low-noise, low-level amplifiers inside the structure of the cross loop.

6. The method of claim 5 wherein the cross loop windings are formed on a hollow cross ferrite structure and said amplifiers are shielded in the respective hollow spaces of the ferrite cross structure.

7. The method of claim 5 wherein the ferrite cross is grounded to the amplifiers by connecting to board-grounded planes of the amplifiers.

8. A magnetic cross-loop ferrite antenna system for receiving radio signals and having, in combination, orthogonally crossed pairs of windings on a ferrite cross; means for tuning the windings to a carrier radio frequency to generate from the received signals both in-phase and quadrature circulating current components; and means for eliminating only the quadrature current components.

9. The antenna system of claim 8 wherein said eliminating means comprises second pairs of orthogonal windings wound respectively on top of the first-named pairs with the same pitch clockwise, but in the opposite direction.

10. The antenna system of claim 8 wherein said eliminating means comprises one or both of inductive or capacitor couplings between the center of the cross antenna windings and ground, respectively to counter capacitive or inductive coupling between the axes of the cross loop.

11. The antenna system of claim 8 wherein the said eliminating means comprises similar capacitances connected between each adjacent outer end of the windings of the cross-loop antenna.

12. The antenna system of claim 8 wherein similar low-noise, low-level amplifiers, one for and connected to each winding, are provided inside the corresponding structure of the cross loop.

13. The antenna system of claim 12 wherein the cross loop windings are formed on a hollow shell cross ferrite structure and said amplifiers are shielded within the respective hollow spaces of the ferrite cross structure.

14. The antenna system of claim 12 wherein the amplifiers each have circuit board ground planes and these are connected to a grounding terminal of the ferrite cross structure.

15. The antenna system of claim 14 wherein said amplifier circuit ground planes extend outside the circuit board and are clamped by the adjacent upper and lower ferrite shells and together with radio-frequency gasketing.

16. The antenna system of claim 14 wherein the surfaces of the ferrite cross serve as the ground plane for the antenna.

* * * * *